United States Patent
Zhao (10) Patent No.: US 11,204,780 B2
(45) Date of Patent: Dec. 21, 2021

(54) MAINBOARD AND SERVER

(71) Applicant: ZHENGZHOU YUNHAI INFORMATION TECHNOLOGY CO., LTD., Henan (CN)

(72) Inventor: Weitao Zhao, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 694 days.

(21) Appl. No.: 16/097,236

(22) PCT Filed: Nov. 30, 2017

(86) PCT No.: PCT/CN2017/113861
§ 371 (c)(1),
(2) Date: Oct. 26, 2018

(87) PCT Pub. No.: WO2019/019504
PCT Pub. Date: Jan. 31, 2019

(65) Prior Publication Data
US 2021/0224081 A1 Jul. 22, 2021

(30) Foreign Application Priority Data

Jul. 28, 2017 (CN) .......................... 201710628084.7

(51) Int. Cl.
*G06F 9/445* (2018.01)
*G06F 15/80* (2006.01)
(52) U.S. Cl.
CPC ...... *G06F 9/44505* (2013.01); *G06F 9/44552* (2013.01); *G06F 15/8038* (2013.01)
(58) Field of Classification Search
CPC .................................................. G06F 9/445
See application file for complete search history.

(56) References Cited

U.S. PATENT DOCUMENTS 4,504,906 A * 3/1985 Itaya ..................... G06F 15/167
710/100
6,708,283 B1 * 3/2004 Nelvin ................ G06F 11/2005
710/316

(Continued)

FOREIGN PATENT DOCUMENTS

| CN | 106774706 A | 5/2017 |
| CN | 206235979 U | 6/2017 |
| CN | 107301151 A | 10/2017 |

OTHER PUBLICATIONS

International Search Report for PCT/CN2017/113861 dated Apr. 26, 2018, ISA/CN.

*Primary Examiner* — Jae U Jeon
(74) *Attorney, Agent, or Firm* — Yue (Robert) Xu; Apex Attorneys at Law, LLP (57) ABSTRACT

A mainboard and a server are provided. The mainboard includes: a board body, a preset number of Purley platform central processors, and one or more memories. The preset number of Purley platform central processors and the one or more memories are installed on the board body. The Purley platform central processors are sequentially connected with each other, and each of the memories is connected to one of the Purley platform central processors. Each of the memories is configured to receive to-be-burned data inputted from outside and transmit the to-be-burned data to the Purley platform central processor connected with the memory. Each of the Purley platform central processors is configured to burn the to-be-burned data when receiving the to-be-burned data transmitted by the connected memory connected with the Purley platform central processor, to have a function corresponding to the to-be-burned data.

16 Claims, 6 Drawing Sheets

(56) References Cited

U.S. PATENT DOCUMENTS

| | | | |
|---|---|---|---|
| 2005/0204395 A1* | 9/2005 | Wu | G11B 27/327 725/89 |
| 2014/0189278 A1* | 7/2014 | Peng | G06F 12/0223 711/170 |
| 2017/0185515 A1 | 6/2017 | Fahim et al. | |
| 2018/0364784 A1* | 12/2018 | Luo | G06F 13/4072 |

* cited by examiner

MAINBOARD AND SERVER

The present application is the national phase of PCT International Patent Application PCT/CN2017/113861, filed on Nov. 30, 2017 which claims the priority to Chinese Patent Application No. 201710628084.7, titled "MAINBOARD AND SERVER", filed with the Chinese Patent Office on Jul. 28, 2017, both of which are incorporated herein by reference in their entireties.

FIELD

The present disclosure relates to the technical field of computers, and in particular to a mainboard and a server.

BACKGROUND

A mainboard is a core component of a computer, and all functions of the computer are achieved by the operation of the mainboard.

Currently, functions of the mainboard are preset. During usage of the mainboard, if a user desires to use a new function of the mainboard, the new function cannot be directly set in the mainboard by the user, and it is required to install an external programmable device such as a FPGA card in the mainboard, and the new function is added to the mainboard by using the installed external programmable device. In the conventional technology, since a new-added function cannot be directly set for the mainboard, the mainboard has poor function expandability.

SUMMARY

A mainboard and a server are provided in the present disclosure, to improve function expandability of the mainboard.

In a first aspect, a mainboard is provided in the present disclosure. The mainboard includes: a board body, a preset number of Purley platform central processors, and one or more memories;

the preset number of Purley platform central processors and the one or more memories are installed on the board body;

the preset number of Purley platform central processors are sequentially connected with each other, and each of the memories is connected to one of the preset number of Purley platform central processors;

each of the memories is configured to: receive to-be-burned data inputted from outside, and transmit the to-be-burned data to the Purley platform central processor connected with the memory; and each of the Purley platform central processors is configured to burn the to-be-burned data when receiving the to-be-burned data transmitted by the memory connected with the Purley platform central processor, to have a function corresponding to the to-be-burned data.

Preferably, each of the Purley platform central processors includes: a field programmable gate array FPGA chip configured to: determine a programming language corresponding to the to-be-burned data among one or more predefined programming languages; and burn the to-be-burned data using the determined programming language to cause the Purley platform central processor to have the function corresponding to the to-be-burned data.

Preferably, the mainboard further includes a platform controller hub, where the platform controller hub is connected to at least one of the preset number of Purley platform central processors and at least one interface in the board body, and is configured to: acquire operating data of the at least one interface and transmit the operating data of the at least one interface to the Purley platform central processor connected with the platform controller hub; and receive processing data transmitted by the Purley platform central processor connected with the platform controller hub and transmit the processing data to the at least one interface; and each of the Purley platform central processors is further configured to: generate the processing data based on the operating data of the at least one interface when receiving the operating data of the at least one interface transmitted by the connected platform controller hub; and transmit the processing data to the platform controller hub.

Preferably, a network module is built in the platform controller hub, where the network module is configured to: acquire network data provided by an external network device and transmit the network data to the Purley platform central processor connected with the platform controller hub; and receive interaction data transmitted by the Purley platform central processor connected with the platform controller hub and transmit the interaction data to the network device; and each of the Purley platform central processors is further configured to: generate the interaction data based on the network data when receiving the network data transmitted by the network module built in the connected platform controller hub; and transmit the interaction data to the network module.

Preferably, the platform controller hub further includes an encryption module, where each of the memories is further configured to: receive to-be-encrypted data inputted from outside, and transmit the to-be-encrypted data to the Purley platform central processor connected with the memory;

each of the Purley platform central processors is further configured to: call an encryption instruction stored in the encryption module when receiving the to-be-encrypted data transmitted by the memory, and encrypt the to-be-encrypted data using the called encryption instruction; and the encryption module is configured to store the encryption instruction.

Preferably, the mainboard further includes a baseboard management controller, where the baseboard management controller is connected to the platform controller hub and at least one external operation supporting device, and is configured to: acquire a device parameter of the operation supporting device and transmit the device parameter to the platform controller hub; and receive an adjustment parameter forwarded by the platform controller hub and transmit the adjustment parameter to the at least one operation supporting device;

the platform controller hub is further configured to: receive the device parameter transmitted by the baseboard management controller and forward the device parameter to the Purley platform central processor connected with the platform controller hub; and receive the adjustment parameter transmitted by the Purley platform central processor connected with the platform controller hub and forward the adjustment parameter to the baseboard management controller; and each of the Purley platform central processors is further configured to: generate the adjustment parameter based on the device parameter when receiving the device parameter forwarded by the connected platform controller hub; and transmit the adjustment parameter to the platform controller hub.

Preferably, the mainboard further includes a clock chip, where the clock chip is connected to the Purley platform central processors, the memories, the platform controller hub, and the baseboard management controller;

the clock chip is configured to: determine a clock sequence for the Purley platform central processors, the memories, the platform controller hub and the baseboard management controller; and transmit the clock sequence to the Purley platform central processors, the memories, the platform controller hub and the baseboard management controller;

each of the Purley platform central processors is further configured to perform clock synchronization based on the received clock sequence when receiving the clock sequence transmitted by the clock chip;

each of the memories is further configured to perform clock synchronization based on the received clock sequence when receiving the clock sequence transmitted by the clock chip;

the platform controller hub is further configured to perform clock synchronization based on the received clock sequence when receiving the clock sequence transmitted by the clock chip; and the baseboard management controller is further configured to perform clock synchronization based on the received clock sequence when receiving the clock sequence transmitted by the clock chip.

Preferably, one of the preset number of Purley platform central processors, which is connected to the platform controller hub, is further configured to: store power supply timing sequences, and control power consumption time periods of electric devices based on the power supply timing sequences; and the electric devices include: the Purley platform central processors, the memories, the platform controller hub, the baseboard management controller, the at least one interface, and the at least one operation supporting device.

Preferably, the one or more memories include sixteen memories;

the Purley platform central processors include two Purley platform central processors including a first Purley platform central processor and a second Purley platform central processor;

the first Purley platform central processor is connected to the second Purley platform central processor;

eight memories among the sixteen memories are connected to the first Purley platform central processor;

the other eight memories among the sixteen memories being not connected to the first Purley platform central processor are connected to the second Purley platform central processor; and the first Purley platform central processor is connected to the platform controller hub.

In a second aspect, a server is provided in the present disclosure. The server includes at least one mainboard described above.

According to the mainboard and the server provided in the present disclosure, the preset number of Purley platform central processors and the memories are installed on the board body. The Purley platform central processors are sequentially connected with each other, and each of the memories is connected to one of the Purley platform central processors. Each of the memories is used to receive to-be-burned data and transmit the received to-be-burned data to the Purley platform central processor connected with the memory. When the Purley platform central processor receives the to-be-burned data transmitted by the memory connected with the Purley platform central processor, the Purley platform central processor burns the to-be-burned data, to have a function corresponding to the to-be-burned data. It can be seen from the above that in this solution, the Purley platform central processor can directly burn the to-be-burned data received by the memory, to have the function corresponding to the to-be-burned data. Therefore, function expandability of the mainboard can be improved with the embodiment of the present disclosure.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

In order to make objects, technical solutions and advantages of embodiments of the present disclosure more clear, the technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

Figure 1:
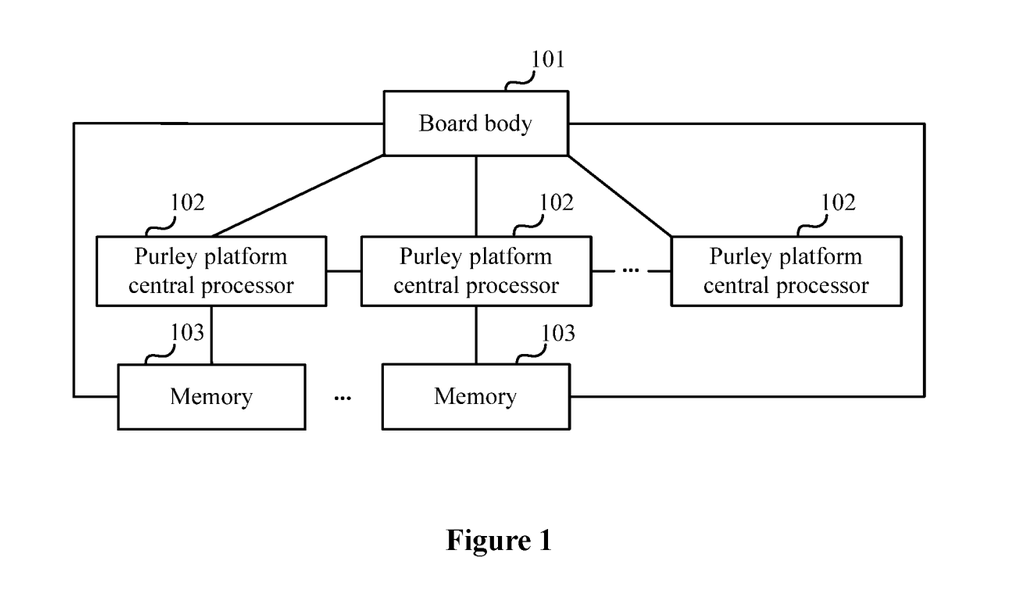
FIG. 1 is a schematic structural diagram of a mainboard according to an embodiment of the present disclosure.

As shown in FIG. 1, a mainboard is provided according to an embodiment of the present disclosure.

The mainboard may include: a board body 101, a preset number of Purley platform central processors 102, and one or more memories 103.

The preset number of Purley platform central processors 102 and the one or more memories 103 are installed on the board body 101.

The preset number of Purley platform central processors 102 are sequentially connected with each other. Each of the memories 103 is connected to one of the preset number of Purley platform central processors 102.

Each of the memories 103 is configured to: receive to-be-burned data inputted from outside, and transmit the to-be-burned data to the Purley platform central processor 102 connected with the memory.

Each of the Purley platform central processors 102 is configured to burn the to-be-burned data when receiving the to-be-burned data transmitted by the memory 103 connected with the Purley platform central processor, to have a function corresponding to the to-be-burned data.

According to the embodiment shown in FIG. 1, the preset number of Purley platform central processors and the memories are installed on the board body. The Purley platform central processors are sequentially connected with each other, and each of the memories is connected to one of the Purley platform central processors. Each of the memories is used to receive to-be-burned data and transmit the received to-be-burned data to the Purley platform central processor connected with the memory. When the Purley platform central processor receives the to-be-burned data transmitted by the memory connected with the Purley platform central processor, the Purley platform central processor burns the to-be-burned data, to have a function corresponding to the to-be-burned data. It can be seen from the above that in this solution, the Purley platform central processor can directly burn the to-be-burned data received by the memory, to have the function corresponding to the to-be-burned data. Therefore, function expandability of the mainboard can be improved with the embodiment of the present disclosure.

In an embodiment of the present disclosure, the type and the size of the board body may be determined according to service requirements. It should be noted that in the process of determining the size of the board body, sizes of components installed in the board body should be considered to ensure that the components can be installed in the board body.

In this embodiment, for example, a rectangular board body having a thickness of 97.6 mil, having fourteen layers, and having a length of 550 mm and a width of 180 mm may be selected.

In an embodiment of the present disclosure, the number of memories connected to each Purley platform central processor may be determined according to the service requirements, and there are at least three cases as follows.

In a first case, the number of Purley platform central processors is one, and all the memories are connected to the Purley platform central processor.

In a second case, the number of Purley platform central processors is at least two, and all the memories are connected to one of the at least two Purley platform central processors.

In a third case, the number of Purley platform central processors is at least two, and each of the Purley platform central processors is connected to a certain number of memories.

In this embodiment, the type and the size of the memory may be determined according to the service requirements.

In an embodiment of the present disclosure, the type and the content of the to-be-burned data may be determined according to the service requirements. For example, if the Purley platform central processor is required to have a first function, first to-be-burned data corresponding to the first function is transmitted to the memory. The memory transmits the received first to-be-burned data to the Purley platform central processor connected with the memory, so that the Purley platform central processor burns the to-be-burned data to have the first function corresponding to the first to-be-burned data.

Figure 2:
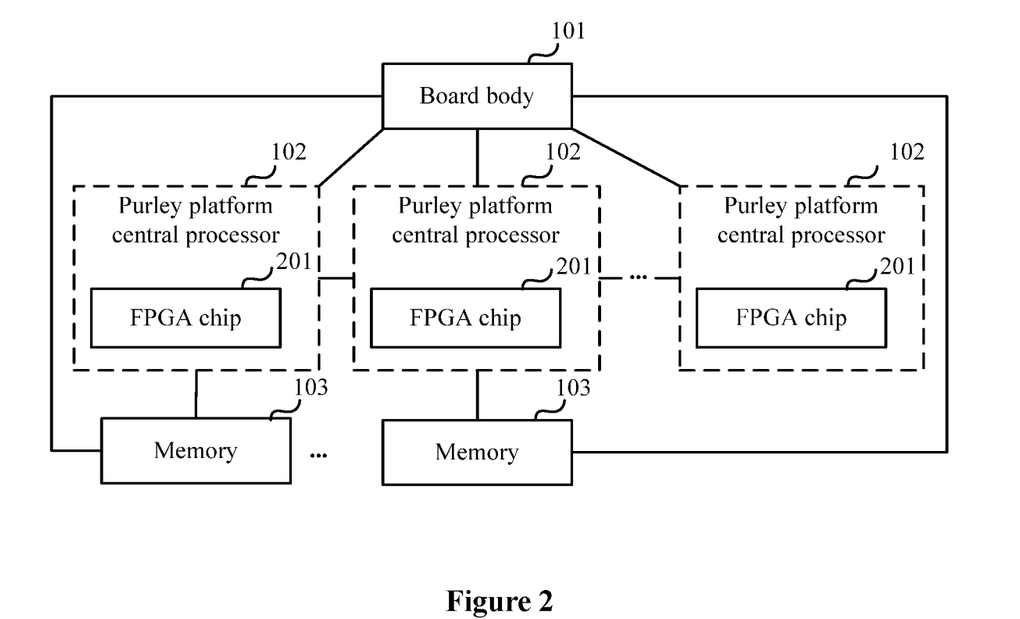
FIG. 2 is a schematic structural diagram of a mainboard including an FPGA chip according to an embodiment of the present disclosure.

In an embodiment of the present disclosure, as shown in FIG. 2, each of the Purley platform central processors 102 includes a field programmable gate array FPGA chip 201.

The FPGA chip 201 is configured to: determine a programming language corresponding to the to-be-burned data among one or more predefined programming languages; and burn the to-be-burned data using the determined programming language, to cause the Purley platform central processor 102 to have the function corresponding to the to-be-burned data.

In this embodiment, for example, a first programming language and a second programming language are predefined in the FPGA chip according to service requirements. When the FPGA chip receives the first to-be-burned data transmitted by the memory, a programming language corresponding to the first to-be-burned data is determined from the predefined first programming language and the second programming language. The method for determining the programming language may be performed by steps including: matching a string corresponding to each of the two programming languages with a string corresponding to the to-be-burned data; and determining the current programming language as the programming language corresponding to the to-be-burned data if the matching reaches a preset value. For example, the first programming language may be determined as the programming language corresponding to the first to-be-burned data.

After the programming language corresponding to the first to-be-burned data is determined, the first to-be-burned data is burned using the determined first programming language. The burning process may be performed by steps including: programing the to-be-burned data using the determined programming language; performing optimization and verification on the programming result after the programming is completed; and performing the burning after the verification passes. When the burning is completed, the Purley platform central processor including the FPGA chip has the function corresponding to the to-be-burned data.

According to the above embodiment, each of the Purley platform central processors includes an FPGA chip. The FPGA chip is used to determine a programming language corresponding to the to-be-burned data among the predefined programming language and burn the to-be-burned data using the determined programming language, so that the Purley platform central processor including the FPGA chip has the function corresponding to the to-be-burned data. It can be seen from the above that, the Purley platform central processor can have the function corresponding to the to-be-burned data by using the FPGA chip, which facilitates the operation of adding a function for the mainboard.

Figure 3:
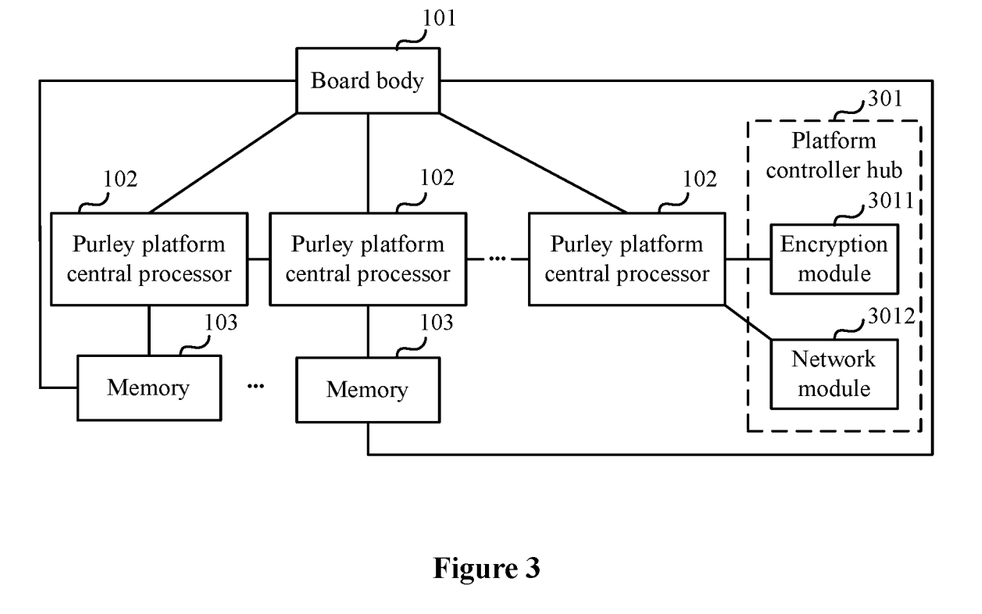
FIG. 3 is a schematic structural diagram of a mainboard including a platform controller hub according to an embodiment of the present disclosure.

In an embodiment of the present disclosure, as shown in FIG. 3, the mainboard may further include a platform controller hub 301.

The platform controller hub 301 is connected to at least one of the preset number of Purley platform central processors 102 and at least one interface in the board body 101. The platform controller hub 301 is configured to: acquire operating data of the at least one interface and transmit the operating data of the at least one interface to the Purley platform central processor 102 connected with the platform controller hub; and receive processing data transmitted by the Purley platform central processor 102 connected with the platform controller hub and transmit the processing data to the at least one interface.

Each of the Purley platform central processors 102 is further configured to: generate the processing data based on the operating data of the at least one interface when receiving the operating data of the at least one interface transmitted by the connected platform controller hub 301; and transmit the processing data to the platform controller hub 301.

In this embodiment, the number and types of interfaces connected to the platform controller hub may be determined according to the service requirements. For example, the platform controller hub is connected to two system disk interfaces.

In this embodiment, the number of Purley platform central processors connected to the platform controller hub may be determined according to the service requirements, and there are at least three cases as follows.

In a first case, the platform controller hub is connected to one of the preset number of Purley platform central processors. For example, in FIG. 3, the platform controller hub is connected to one of the preset number of Purley platform central processors.

In a second case, the platform controller hub is connected to at least two of the preset number of Purley platform central processors.

In a third case, the platform controller hub is connected to all of the preset number of Purley platform central processors.

For the first case of the embodiment, after the platform controller hub acquires the operating data of each interface, the platform controller hub transmits the operating data directly to the Purley platform central processor connected with the platform controller hub, so that the Purley platform central processor connected with the platform controller hub generates processing data based on the operating data. When the platform controller hub receives the processing data transmitted by the Purley platform central processor connected with the platform controller hub, the platform controller hub determines an interface corresponding to the processing data and transmits the processing data to the determined interface, so that the interface receiving the processing data performs processing based on the processing data.

For the second case and the third case of the embodiment, after the platform controller hub acquires the operating data of each interface, the platform controller hub determines the Purley platform central processor corresponding to the operating data and transmits the operating data to the determined Purley platform central processor, so that the Purley platform central processor generates processing data based on the operating data. When the platform controller hub receives the processing data transmitted by each of Purley platform central processors connected with the platform controller hub, the platform controller hub determines an interface corresponding to the processing data and transmits the processing data the determined interface, so that the interface receiving the processing data performs processing based on the processing data.

In this embodiment, the platform controller hub may be abbreviated as PCH.

According to the above embodiment, the mainboard may further include a platform controller hub. The platform controller hub is used to acquire operating data of each interface in the board body and transmit the acquired operating data to the Purley platform central processor connected with the platform controller hub, so that the Purley platform central processor connected with the platform controller hub generates processing data based on the operating data and feeds back the generated processing data to the platform controller hub. The platform controller hub forwards the processing data to the interface, so that the interface performs processing based on the processing data. It can be seen that the operation of each interface in the board body may be managed by data interaction between the platform controller hub and the Purley platform central processor.

In an embodiment of the present disclosure, as shown in FIG. 3, a network module 3011 is built in the platform controller hub 301.

The network module 3011 is configured to: acquire network data provided by an external network device and transmit the network data to the Purley platform central processor 102 connected with the platform controller hub; and receive interaction data transmitted by the Purley platform central processor 102 connected with the platform controller hub and transmit the interaction data to the network device.

Each of the Purley platform central processors 102 is further configured to: generate the interaction data based on the network data when receiving the network data transmitted by the network module 3011 built in the connected platform controller hub 301; and transmit the interaction data to the network module 3011.

In this embodiment, the type of the network module built in the platform controller hub may be determined according to the service requirements. For example, a 10G network module may be selected.

In this embodiment, since the network module is built in the platform controller hub, no additional network chip is required to be arranged in the mainboard. With the built-in network module, the platform controller hub can acquire network data provided by an external network device, and data interaction between the network device and the Purley platform central processor can be implemented.

According to the above embodiment, a network module is built in the platform controller hub. With the built-in network module, the platform controller hub can acquire network data provided by an external network device, and data interaction between the network device and the Purley platform central processor can be implemented. Since the data interaction with the network device may be performed by using the network module, the network function can be implemented in a case that no additional network chip is arranged.

In an embodiment of the present disclosure, as shown in FIG. 3, the platform controller hub 301 may further include an encryption module 3012.

Each of the memories 103 is further configured to: receive to-be-encrypted data inputted from outside, and transmit the to-be-encrypted data to the Purley platform central processor 102 connected with the memory.

Each of the Purley platform central processors 102 is further configured to: call an encryption instruction stored in the encryption module 3012 when receiving the to-be-encrypted data transmitted by the memory 103, and encrypt the to-be-encrypted data using the called encryption instruction.

The encryption module 3012 is configured to store the encryption instruction.

In this embodiment, for example, when a first memory receives first to-be-encrypted data inputted from outside, the first memory transmits the first to-be-encrypted data to a first Purley platform central processor connected with the first memory. When the first Purley platform central processor receives the first to-be-encrypted data transmitted by the first memory, the first Purley platform central processor calls an encryption instruction A stored in the encryption module, and encrypts the first to-be-encrypted data using the called encryption instruction A. The type and the content of the encryption instruction stored in the encryption module may be determined according to the service requirements.

In this embodiment, the encryption module may be regarded to as the Intel Quick Assist. In addition, the encryption module is used for optimization on an accelerator in server, improving performances of single applications such as secure encryption or financial computing of the accelerator, while reducing power consumption.

According to the above embodiment, the platform controller hub may further include an encryption module. When a memory receives to-be-encrypted data, the memory transmits the to-be-encrypted data to the Purley platform central processor connected with the memory. When the Purley platform central processor receives the to-be-encrypted data transmitted by the memory, the Purley platform central processor calls an encryption instruction stored in the encryption module and encrypts the to-be-encrypted data using the called encryption instruction. It can be seen from the above that, since the encryption module is built in the platform controller hub, no additional encryption device is required to be arranged, which facilitates the operation of encrypting the to-be-encrypted data.

Figure 4:
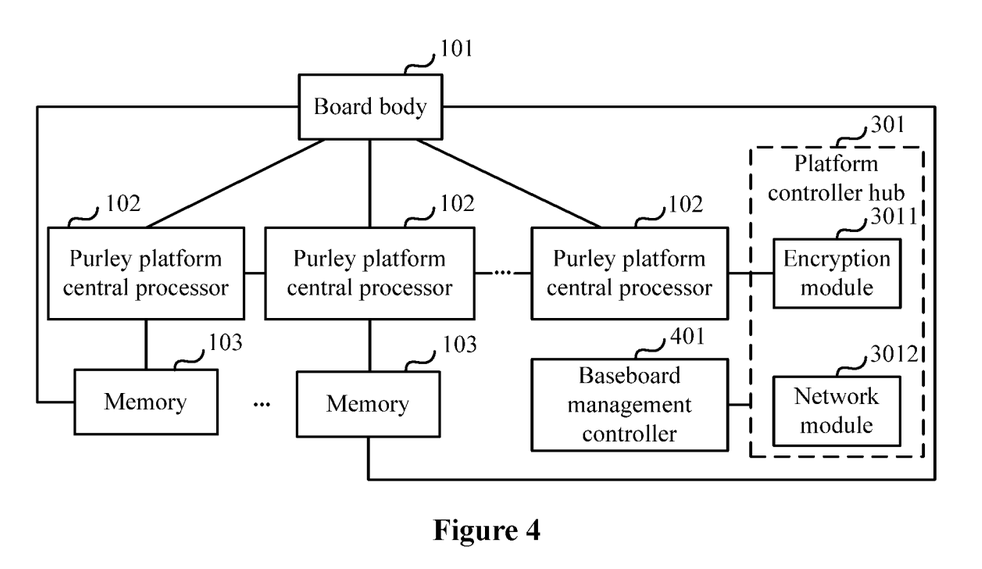
FIG. 4 is a schematic structural diagram of a mainboard including a baseboard management controller according to an embodiment of the present disclosure.

In an embodiment of the present disclosure, as shown in FIG. 4, the mainboard may further include a baseboard management controller 401.

The baseboard management controller 401 is connected to the platform controller hub 301 and at least one external operation supporting device. The baseboard management controller 401 is configured to: acquire a device parameter of the operation supporting device and transmit the device parameter to the platform controller hub 31; and receive an adjustment parameter forwarded by the platform controller hub 301 and transmit the adjustment parameter to the at least one operation supporting device.

The platform controller hub 301 is further configured to: receive the device parameter transmitted by the baseboard management controller 401 and forward the device parameter to the Purley platform central processor 102 connected with the platform controller hub; and receive the adjustment parameter transmitted by the Purley platform central processor 102 connected with the platform controller hub and forward the adjustment parameter to the baseboard management controller 401.

Each of the Purley platform central processors 102 is configured to: generate the adjustment parameter based on the device parameter when receiving the device parameter forwarded by the connected platform controller hub 301; and transmit the adjustment parameter to the platform controller hub 301.

In this embodiment, the number and types of operation supporting devices connected to the baseboard management controller may be determined according to the service requirements. For example, the baseboard management controller is connected to a fan.

In this embodiment, after the baseboard management controller acquires a device parameter of each operation supporting device, the baseboard management controller transmits the device parameter to the platform controller hub connected to the baseboard management controller, so that the platform controller hub forwards the device parameter to the Purley platform central processor connected with the platform controller hub. After the Purley platform central processor receives the device parameter, the Purley platform central processor generates an adjustment parameter corresponding to the device parameter and feeds back the adjustment parameter to the platform controller hub, so that the platform controller hub transmits the adjustment parameter to the baseboard management controller. After the baseboard management controller receives the adjustment parameter transmitted by the platform controller hub, the baseboard management controller transmits the adjustment parameter to the operation supporting device corresponding to the adjustment parameter, so that the operation supporting device performs operation adjustment based on the adjustment parameter.

According to the above embodiment, the mainboard may further include a baseboard management controller. The baseboard management controller is used to acquire a device parameter of each operation supporting device in the board body, and transmit the acquired device parameter to the connected platform controller hub, so that the platform controller hub forwards the device parameter to the Purley platform central processor connected with the platform controller hub. When the Purley platform central processor receives the device parameter, the Purley platform central processor generates an adjustment parameter based on the device parameter and feeds back the generated adjustment parameter to the operation supporting device via the platform controller hub and the baseboard management controller, so that the operation supporting device performs adjusting based on the adjustment parameter. It can be seen that the operation of each operation supporting device may be managed by data interaction among the baseboard management controller, the platform controller hub, and the Purley platform central processor.

In an embodiment of the present disclosure, the platform controller hub may further include a clock module. The clock module is used to control clock synchronization of components in the mainboard. However, there are generally a large number of components in the mainboard, and the clock module in the platform controller hub does not control the clock synchronization of the large number of components well. Therefore, an additional clock chip is required to be arranged to control the clock synchronization of the components in the mainboard.

Figure 5:
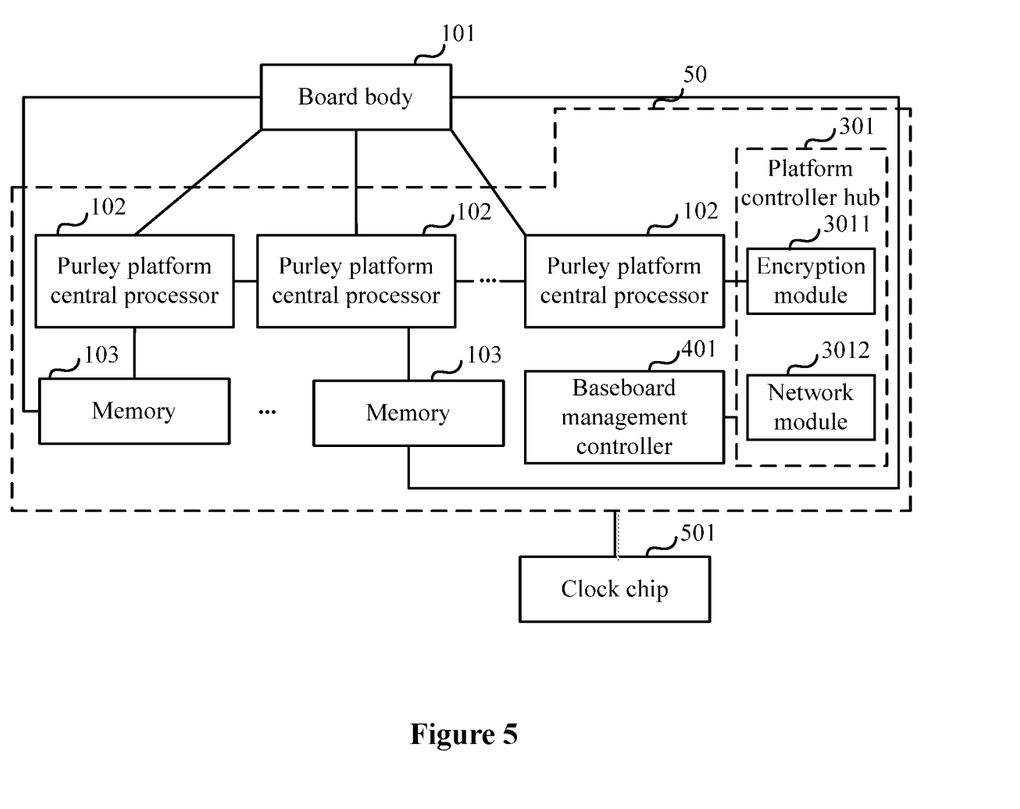
FIG. 5 is a schematic structural diagram of a mainboard including a clock chip according to an embodiment of the present disclosure.

In an embodiment of the present disclosure, as shown in FIG. 5, the mainboard may further include a clock chip 501.

The clock chip 501 is connected to the Purley platform central processors 102, the memories 103, the platform controller hub 301, and the baseboard management controller 401.

The clock chip 501 is configured to: determine a clock sequence for the Purley platform central processors 102, the memories 103, the platform controller hub 301, and the baseboard management controller 401; and transmit the clock sequence to the Purley platform central processors 102, the memories 103, the platform controller hub 301, and the baseboard management controller 401.

Each of the Purley platform central processors 102 is further configured to perform clock synchronization based on the received clock sequence when receiving the clock sequence transmitted by the clock chip 501.

Each of the memories 103 is further configured to perform clock synchronization based on the received clock sequence when receiving the clock sequence transmitted by the clock chip 501.

The platform controller hub 301 is further configured to perform clock synchronization based on the received clock sequence when receiving the clock sequence transmitted by the clock chip 501.

The baseboard management controller 401 is further configured to perform clock synchronization based on the received clock sequence when receiving the clock sequence transmitted by the clock chip 501.

In this embodiment, the clock chip may be used to determine a clock sequence for the Purley platform central processors, the memories, the platform controller hub and the baseboard management controller, and transmit the determined clock sequence to the Purley platform central processors, the memories, the platform controller hub and the baseboard management controller, so that the Purley platform central processors, the memories, the platform controller hub, and the baseboard management controller can maintain communication signals consistent in the data interaction process, to prevent the communication signals from being disordered due to delay of the communication signals.

In this embodiment, the Purley platform central processors, the memories, the platform controller hub, and the baseboard management controller enclosed by a dashed block 50 in FIG. 5 are all connected to the clock chip 501.

In this embodiment, the type of the clock chip may be determined based on the service requirements. For example, a clock chip of 100M may be selected.

According to the above embodiment, the mainboard may further include a clock chip. The clock chip is used to determine a clock sequence for the Purley platform central processors, the memories, the platform controller hub and the baseboard management controller, and transmit the clock sequence to the Purley platform central processors, the memories, the platform controller hub and the baseboard management controller, so that the components receiving the clock sequence are synchronized to maintain the consistency of communication signals of the components.

In an embodiment of the present disclosure, one of the preset number of Purley platform central processors 102, which is connected to the platform controller hub 301, is further configured to: store power supply timing sequences, and control power consumption time periods of electric devices based on the power supply timing sequences. The electric devices include: the Purley platform central processors 102, the memories 103, the platform controller hub 301, the baseboard management controller 401, the at least one interface, and the at least one operation supporting device.

In this embodiment, the Purley platform central processors, the memories, the platform controller hub, the baseboard management controller, the interface and the operation supporting device on the mainboard are each provided with a power supply, and each operates by using a power supplying voltage provided by the power supply. The power supply for each electric device may be a battery, the mainboard, or an uninterruptible power supply UPS.

Figure 6:
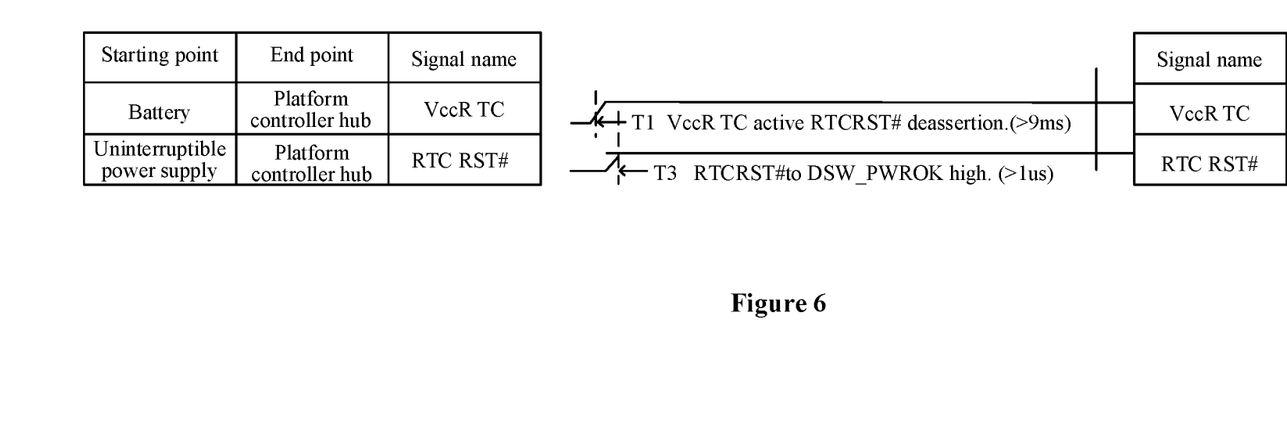
FIG. 6 is a timing diagram of a power supply according to an embodiment of the present disclosure.

In this embodiment, in order to ensure that each electric device obtains the power supplying voltage at a set time instant, it is required to set a power supply timing sequence for each electric device. For example, FIG. 6 shows preset power supply timing sequences. External power supplies are used to sequentially supply power to the electric devices based on a stored power supply timing sequence table.

According to the above embodiment, the Purley platform central processor may further be used to store power supply timing sequences, and control, based on the power supply timing sequences, power consumption time periods of the Purley platform central processors, the memories, the platform controller hub, the baseboard management controller, the interface and the operation supporting device, to ensure that each of the electric devices obtains the power supplying voltage at the power consumption time instant corresponding to the electric device.

Figure 7:
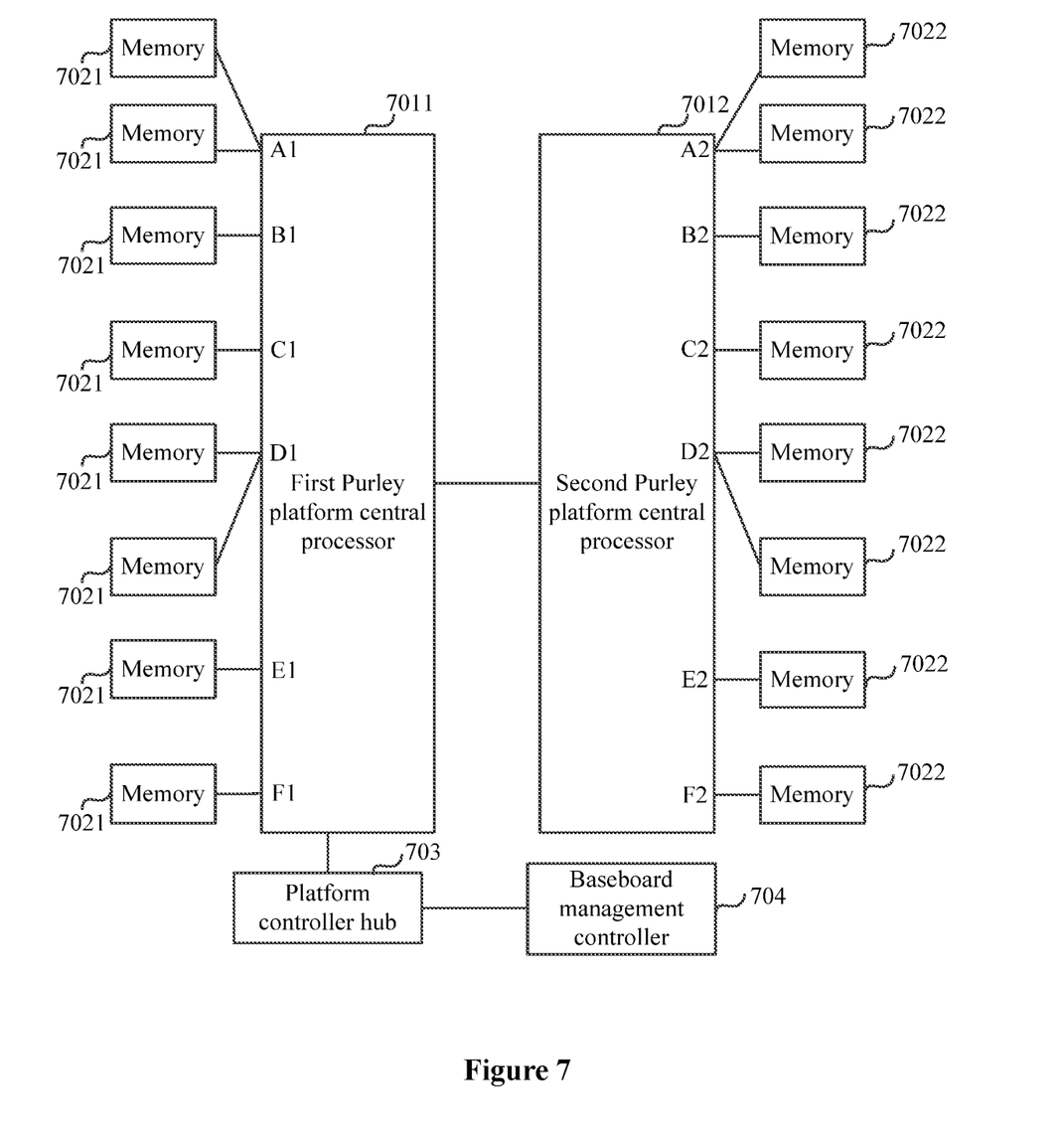
FIG. 7 is a schematic structural diagram a mainboard according to another embodiment of the present disclosure.

In an embodiment of the present disclosure, as shown in FIG. 7, the one or more memories include sixteen memories.

The Purley platform central processors include two Purley platform central processors including a first Purley platform central processor 7011 and a second Purley platform central processor 7012.

The first Purley platform central processor 7011 is connected to the second Purley platform central processor 7012.

Eight memories 7021 among the sixteen memories are connected to the first Purley platform central processor 7011.

The other eight memories 7012 among the sixteen memories being not connected to the first Purley platform central processor 7011, are connected to the second Purley platform central processor 7012.

The first Purley platform central processor 7011 is connected to a platform controller hub 703.

In this embodiment, adjacent memories should be spaced by a set distance from each other. The set distance may be determined according to the service requirements. It should be noted that, with the set distance, heat from the memories in operation can be dissipated. In addition, types of the memories may be determined according to the service requirements, which may be the same or different. For example, a memory supporting a maximum rate of 2666 MT/S Rate and the LLCR specification may be selected as each of the memories.

In this embodiment, the first Purley platform central processor and the second Purley platform central processor may be connected with each other via a universal peripheral interface UPI bus, which may be implemented by a UPI for 9.6, of 10.4 GT/s. In addition, a virtual reality VR system in each of the Purley platform central processors at least supports 165 W.

In this embodiment, each of the first Purley platform central processor and the second Purley platform central processor is provided with six memory channels, and is connected to the corresponding eight memories via the six memory channels. The connection to the memories is illustrated below by taking the first Purley platform central processor as an example. As can be seen from FIG. 7, each of a memory channel A1 and a memory channel D1 is connected with two memories, and each of memory channels B1, C1, E1, and F1 is connected with one memory.

In this embodiment, each of the first Purley platform central processor and the second Purley platform central processor may be provided with at least one interface according to the service requirements. The type of the interface may be determined according to the service requirements. For example, the interface in each Purley platform central processor includes: one independent RJ45 10/100/1000M integrated management port; one TPM 2.0 interface for connecting a TPM (Trusted Platform Module) encryption card; two M.2 interfaces for connecting a M.2 hard disk as the system disk; two TF card interfaces, one of the two TF card interfaces is connected to a TF card for a system, the other of the two TF card interfaces is connected to a TF card for the baseboard management controller; two OCUlink for SATA×8 interfaces for extending the serial ATA interface specification SATA; one RJ45 network management interface; one high-density interface connector interface for connecting a VGA display, a USB interface and a system serial port; two USB interfaces for connecting USB devices; one baseboard management controller reset interface; one node positioning button UID interface; eight light-emitting diode interfaces for connecting eight LEDs to display two bits of hexadecimal power-on self-test codes; two high-speed serial computer expansion bus standard PCIE ×16 Slot interfaces; one connector OCP A interface for connecting a network card for the OCP A interface; one connector OCPB interface for connecting a network card for the OCP A and the OCP B interface in combination with the OCP A interface; and one connector OCP C interface for connecting a network PHY (physical layer) card.

In this embodiment, the first Purley platform central processor 7011 and the platform controller hub 703 are connected with each other via a direct media interface DMI bus. The network module in the platform controller hub may be connected to the PCIE ×16 Slot interface in the first Purley platform central processor via a PCIE ×16 bus. The encryption module in the platform controller hub may be connected to the first Purley platform central processor via a PCIE ×16 bus or a PCIE ×8 bus. The type of the bus is related to the type of the encryption module. In addition, the platform controller hub may be provided with at least one interface according to the service requirements. The type of the interface may be determined according to the service requirements. For example, the platform controller hub includes the following interfaces: one baseboard management controller interface for connecting the baseboard management controller 704 via a PCIE bus; four hard disk interfaces for connecting the M.2 hard disk via a PCIE bus; one SATA interface for connecting a SATA M.2 hard disk; and eight processor interfaces for connecting the first Purley platform central processor via the PCIE bus.

In this embodiment, the type of the baseboard management controller may be determined according to the service requirements. For example, a BMC2500 chip conventionally equipped with a KVM switch function in remote management functions may be selected as the baseboard management controller. The baseboard management controller may connected to the platform controller hub via a USB bus, a PCIE bus, a linear predictive coding LPC bus, or a bidirectional two-wire synchronous serial bus I2C bus to perform data interaction.

According to the above embodiment, since each of the Purley platform central processor, the platform controller hub, and the baseboard management controller may be provided with interfaces according to the service requirements, the mainboard has good expandability.

Figure 8:
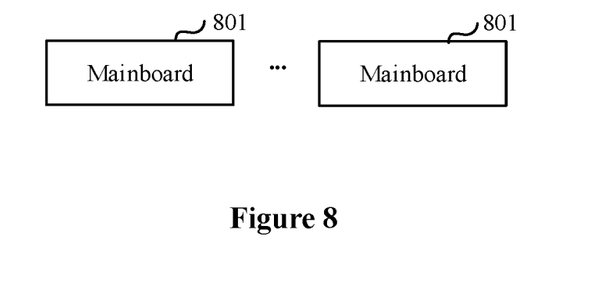
FIG. 8 is a schematic structural diagram of a server according to an embodiment of the present disclosure.

As shown in FIG. 8, a server is provided according to an embodiment of the present disclosure.

The server may include at least one mainboard 801 described above.

According to the embodiment shown in FIG. 8, since each mainboard may have a function corresponding to to-be-burned data by burning the received to-be-burned data, function expandability of the server can be improved with the embodiment of the present disclosure.

In an embodiment of the present disclosure, the server is implemented by a 2U rack server, and two mainboards are arranged in the server to form a server having a 2U4 structure.

In summary, the embodiments of the present disclosure have at least the following beneficial effects.

In a first aspect, in an embodiment of the present disclosure, the preset number of Purley platform central processors and the memories are installed on the board body. The Purley platform central processors are sequentially connected with each other, and each of the memories is connected to one of the Purley platform central processors. Each of the memories is used to receive to-be-burned data and transmit the received to-be-burned data to the Purley platform central processor connected with the memory. When the Purley platform central processor receives the to-be-burned data transmitted by the memory connected with the Purley platform central processor, the Purley platform central processor burns the to-be-burned data, to have a function corresponding to the to-be-burned data. It can be seen from the above that in this solution, the Purley platform central processor can directly burn the to-be-burned data received by the memory, to have the function corresponding to the to-be-burned data. Therefore, function expandability of the mainboard can be improved with the embodiment of the present disclosure.

In a second aspect, in an embodiment of the present disclosure, each of the Purley platform central processors includes an FPGA chip. The FPGA chip is used to determine a programming language corresponding to the to-be-burned data among the predefined programming language and burn the to-be-burned data using the determined programming language, so that the Purley platform central processor including the FPGA chip has the function corresponding to the to-be-burned data. It can be seen from the above that, the Purley platform central processor can have the function corresponding to the to-be-burned data by using the FPGA chip, which facilitates the operation of adding a function for the mainboard.

In a third aspect, in an embodiment of the present disclosure, the mainboard may further include a platform controller hub. The platform controller hub is used to acquire operating data of each interface in the board body and transmit the acquired operating data to the Purley platform central processor connected with the platform controller hub, so that the Purley platform central processor connected with the platform controller hub generates processing data based on the operating data and feeds back the generated processing data to the platform controller hub. The platform controller hub forwards the processing data to the interface, so that the interface performs processing based on the processing data. It can be seen that the operation of each interface in the board body may be managed by data interaction between the platform controller hub and the Purley platform central processor.

In a fourth aspect, in an embodiment of the present disclosure, a network module is built in the platform controller hub. With the built-in network module, the platform controller hub can acquire network data provided by an external network device, and data interaction between the network device and the Purley platform central processor can be implemented. Since the data interaction with the network device may be performed by using the network module, the network function can be implemented in a case that no additional network chip is arranged.

In a fifth aspect, in an embodiment of the present disclosure, the platform controller hub may further include an encryption module. When a memory receives to-be-encrypted data, the memory transmits the to-be-encrypted data to the Purley platform central processor connected with the memory. When the Purley platform central processor receives the to-be-encrypted data transmitted by the memory, the Purley platform central processor calls an encryption instruction stored in the encryption module and encrypts the to-be-encrypted data using the called encryption instruction. It can be seen from the above that, since the encryption module is built in the platform controller hub, no additional encryption device is required to be arranged, which facilitates the operation of encrypting the to-be-encrypted data.

In a sixth aspect, in an embodiment of the present disclosure, the mainboard may further include a baseboard management controller. The baseboard management controller is used to acquire a device parameter of each operation supporting device in the board body, and transmit the acquired device parameter to the connected platform controller hub, so that the platform controller hub forwards the device parameter to the Purley platform central processor connected with platform controller hub. When the Purley platform central processor receives the device parameter, the Purley platform central processor generates an adjustment parameter based on the device parameter and feeds back the generated adjustment parameter to the operation supporting device via the platform controller hub and the baseboard management controller, so that the operation supporting device performs adjusting based on the adjustment parameter. It can be seen that the operation of each operation supporting device may be managed by data interaction among the baseboard management controller, the platform controller hub, and the Purley platform central processor.

In a seventh aspect, in an embodiment of the present disclosure, the mainboard may further include a clock chip. The clock chip is used to determine a clock sequence for the Purley platform central processors, the memories, the platform controller hub and the baseboard management controller, and transmit the determined clock sequence to the Purley platform central processors, the memories, the platform controller hub and the baseboard management controller, so that the components receiving the clock sequence are synchronized to maintain the consistency of communication signals of the components.

In an eighth aspect, in an embodiment of the present disclosure, the Purley platform central processor may further be used to store power supply timing sequences, and control, based on the power supply timing sequences, power consumption time periods of the Purley platform central processors, the memories, the platform controller hub, the baseboard management controller, the interface and the operation supporting device, to ensure that each of the electric devices obtains the power supplying voltage at the power consumption time instant corresponding to the electric device.

In a ninth aspect, in an embodiment of the present disclosure, since each of the Purley platform central processor, the platform controller hub, and the baseboard management controller may be provided with interfaces according to the service requirements, the mainboard has good expandability.

In a tenth aspect, in an embodiment of the present disclosure, since each mainboard may have a function corresponding to to-be-burned data by burning the received to-be-burned data, function expandability of the server can be improved with the embodiment of the present disclosure.

It should be noted that relationship terminologies herein such as "first", "second" are only used to distinguish one entity or operation from another entity or operation, rather than necessitating or implying an actual relationship or order between the entities or operations. Further, terms such as "include", "comprise" or any other variations thereof are intended to be non-exclusive. Therefore, a process, method, article or device including a series of elements includes not only the elements but also other elements that are not enumerated, or further includes the elements inherent for the process, method, article or device. Unless expressively limited otherwise, an element defined by the statement "including a . . . " does not exclude the case that the process, method, article or device including the element may include other similar elements.

It can be understood by those skilled in the art that all or some of steps in the method embodiment may be implemented by hardware instructed by a program. The program may be stored in a computer-readable storage medium. When the program is performed, steps included in the above method embodiment can be performed. The storage medium may include a ROM, a RAM, a magnetic disk, an optical disk and other media that may store program codes.

It should be noted that the above only illustrates preferred embodiments of the present disclosure, and is only intended to describe the technical solutions of the present disclosure, and not to limit the protection scope of the present disclosure. Any modifications, equivalent replacements and improvements made within the spirit and principle of the present disclosure fall within the protection scope of the present disclosure.

The invention claimed is:

1. A mainboard, comprising:
a board body;
a preset number of Purley platform central processors; and
one or more memories, wherein
the preset number of Purley platform central processors and the one or more memories are installed on the board body;
the preset number of Purley platform central processors are sequentially connected with each other, and each of the memories is connected to one of the preset number of Purley platform central processors;
each of the memories is configured to: receive to-be-burned data inputted from outside, and transmit the to-be-burned data to the Purley platform central processor connected with the memory; and
each of the Purley platform central processors is configured to burn the to-be-burned data when receiving the to-be-burned data transmitted by the memory connected with the Purley platform central processor, to have a function corresponding to the to-be-burned data, wherein each of the Purley platform central processors comprises: a field programmable gate array FPGA chip configured to: determine a programming language corresponding to the to-be-burned data among one or more predefined programming languages; and burn the to-be-burned data using the determined programming language to cause the Purley platform central processor to have the function corresponding to the to-be-burned data.

2. The mainboard according to claim 1, further comprising:
a platform controller hub, wherein
the platform controller hub is connected to at least one of the preset number of Purley platform central processors and at least one interface in the board body, and is configured to: acquire operating data of the at least one interface and transmit the operating data of the at least one interface to the Purley platform central processor connected with the platform controller hub; and receive processing data transmitted by the Purley platform central processor connected with the platform controller hub and transmit the processing data to the at least one interface; and each of the Purley platform central processors is further configured to: generate the processing data based on the operating data of the at least one interface when receiving the operating data of the at least one interface transmitted by the connected platform controller hub; and transmit the processing data to the platform controller hub.

3. The mainboard according to claim 2, wherein a network module is built in the platform controller hub, wherein
the network module is configured to: acquire network data provided by an external network device and transmit the network data to the Purley platform central processor connected with the platform controller hub; and receive interaction data transmitted by the Purley platform central processor connected with the platform controller hub and transmit the interaction data to the network device; and
each of the Purley platform central processors is further configured to: generate the interaction data based on the network data when receiving the network data transmitted by the network module built in the connected platform controller hub; and transmit the interaction data to the network module.

4. The mainboard according to claim 3, wherein the platform controller hub further comprises an encryption module, wherein
each of the memories is further configured to: receive to-be-encrypted data inputted from outside, and transmit the to-be-encrypted data to the Purley platform central processor connected with the memory;
each of the Purley platform central processors is further configured to: call an encryption instruction stored in the encryption module when receiving the to-be-encrypted data transmitted by the memory, and encrypt the to-be-encrypted data using the called encryption instruction; and
the encryption module is configured to store the encryption instruction.

5. The mainboard according to claim 2, further comprising:
a baseboard management controller, wherein
the baseboard management controller is connected to the platform controller hub and at least one external operation supporting device, and is configured to: acquire a device parameter of the operation supporting device and transmit the device parameter to the platform controller hub; and receive an adjustment parameter forwarded by the platform controller hub and transmit the adjustment parameter to the at least one operation supporting device;
the platform controller hub is further configured to: receive the device parameter transmitted by the baseboard management controller and forward the device parameter to the Purley platform central processor connected with the platform controller hub; and receive the adjustment parameter transmitted by the Purley platform central processor connected with the platform controller hub and forward the adjustment parameter to the baseboard management controller; and
each of the Purley platform central processors is further configured to: generate the adjustment parameter based on the device parameter when receiving the device parameter forwarded by the connected platform controller hub; and transmit the adjustment parameter to the platform controller hub.

6. The mainboard according to claim 5, further comprising:
a clock chip, wherein
the clock chip is connected to the Purley platform central processors, the memories, the platform controller hub, and the baseboard management controller;
the clock chip is configured to: determine a clock sequence for the Purley platform central processors, the memories, the platform controller hub and the baseboard management controller; and transmit the clock sequence to the Purley platform central processors, the memories, the platform controller hub and the baseboard management controller;
each of the Purley platform central processors is further configured to perform clock synchronization based on the received clock sequence when receiving the clock sequence transmitted by the clock chip;
each of the memories is further configured to perform clock synchronization based on the received clock sequence when receiving the clock sequence transmitted by the clock chip;
the platform controller hub is further configured to perform clock synchronization based on the received clock sequence when receiving the clock sequence transmitted by the clock chip; and
the baseboard management controller is further configured to perform clock synchronization based on the received clock sequence when receiving the clock sequence transmitted by the clock chip.

7. The mainboard according to claim 5, wherein
one of the preset number of Purley platform central processors, which is connected to the platform controller hub, is further configured to: store power supply timing sequences, and control power consumption time periods of electric devices based on the power supply timing sequences; and
the electric devices comprise: the Purley platform central processors, the memories, the platform controller hub, the baseboard management controller, the at least one interface, and the at least one operation supporting device.

8. The mainboard according to claim 5, wherein
the one or more memories comprise sixteen memories;
the Purley platform central processors comprise two Purley platform central processors comprising a first Purley platform central processor and a second Purley platform central processor;
the first Purley platform central processor is connected to the second Purley platform central processor;
eight memories among the sixteen memories are connected to the first Purley platform central processor;
the other eight memories among the sixteen memories being not connected to the first Purley platform central processor are connected to the second Purley platform central processor; and
the first Purley platform central processor is connected to the platform controller hub.

9. A server, comprising:
at least one mainboard according to claim 1.

10. The server according to claim 9, further comprising:
a platform controller hub, wherein
the platform controller hub is connected to at least one of the preset number of Purley platform central processors and at least one interface in the board body, and is configured to: acquire operating data of the at least one interface and transmit the operating data of the at least one interface to the Purley platform central processor connected with the platform controller hub; and receive processing data transmitted by the Purley platform central processor connected with the platform controller hub and transmit the processing data to the at least one interface; and each of the Purley platform central processors is further configured to: generate the processing data based on the operating data of the at least one interface when receiving the operating data of the at least one interface transmitted by the connected platform controller hub; and transmit the processing data to the platform controller hub.

11. The server according to claim 10, wherein a network module is built in the platform controller hub, wherein the network module is configured to: acquire network data provided by an external network device and transmit the network data to the Purley platform central processor connected with the platform controller hub; and receive interaction data transmitted by the Purley platform central processor connected with the platform controller hub and transmit the interaction data to the network device; and each of the Purley platform central processors is further configured to: generate the interaction data based on the network data when receiving the network data transmitted by the network module built in the connected platform controller hub; and transmit the interaction data to the network module.

12. The server according to claim 11, wherein the platform controller hub further comprises an encryption module, wherein each of the memories is further configured to: receive to-be-encrypted data inputted from outside, and transmit the to-be-encrypted data to the Purley platform central processor connected with the memory;

each of the Purley platform central processors is further configured to: call an encryption instruction stored in the encryption module when receiving the to-be-encrypted data transmitted by the memory, and encrypt the to-be-encrypted data using the called encryption instruction; and the encryption module is configured to store the encryption instruction.

13. The server according to claim 10, further comprising: a baseboard management controller, wherein the baseboard management controller is connected to the platform controller hub and at least one external operation supporting device, and is configured to: acquire a device parameter of the operation supporting device and transmit the device parameter to the platform controller hub; and receive an adjustment parameter forwarded by the platform controller hub and transmit the adjustment parameter to the at least one operation supporting device;

the platform controller hub is further configured to: receive the device parameter transmitted by the baseboard management controller and forward the device parameter to the Purley platform central processor connected with the platform controller hub; and receive the adjustment parameter transmitted by the Purley platform central processor connected with the platform controller hub and forward the adjustment parameter to the baseboard management controller; and each of the Purley platform central processors is further configured to: generate the adjustment parameter based on the device parameter when receiving the device parameter forwarded by the connected platform controller hub; and transmit the adjustment parameter to the platform controller hub.

14. The server according to claim 13, further comprising: a clock chip, wherein the clock chip is connected to the Purley platform central processors, the memories, the platform controller hub, and the baseboard management controller;

the clock chip is configured to: determine a clock sequence for the Purley platform central processors, the memories, the platform controller hub and the baseboard management controller; and transmit the clock sequence to the Purley platform central processors, the memories, the platform controller hub and the baseboard management controller;

each of the Purley platform central processors is further configured to perform clock synchronization based on the received clock sequence when receiving the clock sequence transmitted by the clock chip;

each of the memories is further configured to perform clock synchronization based on the received clock sequence when receiving the clock sequence transmitted by the clock chip;

the platform controller hub is further configured to perform clock synchronization based on the received clock sequence when receiving the clock sequence transmitted by the clock chip; and the baseboard management controller is further configured to perform clock synchronization based on the received clock sequence when receiving the clock sequence transmitted by the clock chip.

15. The server according to claim 13, wherein one of the preset number of Purley platform central processors, which is connected to the platform controller hub, is further configured to: store power supply timing sequences, and control power consumption time periods of electric devices based on the power supply timing sequences; and the electric devices comprise: the Purley platform central processors, the memories, the platform controller hub, the baseboard management controller, the at least one interface, and the at least one operation supporting device.

16. The server according to claim 13, wherein the one or more memories comprise sixteen memories;

the Purley platform central processors comprise two Purley platform central processors comprising a first Purley platform central processor and a second Purley platform central processor;

the first Purley platform central processor is connected to the second Purley platform central processor;

eight memories among the sixteen memories are connected to the first Purley platform central processor;

the other eight memories among the sixteen memories being not connected to the first Purley platform central processor are connected to the second Purley platform central processor; and the first Purley platform central processor is connected to the platform controller hub.

\* \* \* \* \*